United States Patent [19]

Goodfellow

[11] Patent Number: 4,674,056
[45] Date of Patent: Jun. 16, 1987

[54] PORTABLE BILLING MACHINE

[75] Inventor: Anthony E. B. Goodfellow, Towcester, England

[73] Assignee: Immediate Business Systems Inc., Wymbush, England

[21] Appl. No.: 797,767

[22] Filed: Nov. 14, 1985

Related U.S. Application Data

[63] Continuation of Ser. No. 694,495, Jan. 25, 1985, abandoned, which is a continuation of Ser. No. 553,414, Nov. 18, 1983, abandoned, which is a continuation of Ser. No. 262,982, May 20, 1981, abandoned, which is a continuation of Ser. No. 72,915, Sep. 6, 1979, abandoned, which is a continuation-in-part of Ser. No. 854,012, Nov. 22, 1977, abandoned.

[30] Foreign Application Priority Data

Nov. 25, 1976 [GB] United Kingdom ............... 49283

[51] Int. Cl.⁴ .................. G06F 15/20; G06K 1/00
[52] U.S. Cl. ................... 364/483; 364/464; 364/900; 235/432
[58] Field of Search ........... 364/464, 483, 401, 403, 364/900, 492; 235/419, 432; 360/4; 340/149, 150, 152 R

[56] References Cited

U.S. PATENT DOCUMENTS

| | | | |
|---|---|---|---|
| 3,422,441 | 1/1969 | Chapsky | 360/4 |
| 3,590,220 | 6/1971 | Ishida et al. | 235/432 |
| 3,842,248 | 10/1974 | Yarnell et al. | 235/419 |
| 3,932,730 | 1/1976 | Ambrosio | 364/464 |
| 3,947,665 | 3/1976 | Hundley | 364/189 |
| 4,001,807 | 1/1977 | Dallimonti | 364/189 |
| 4,025,766 | 5/1977 | Ng et al. | 364/403 |
| 4,110,606 | 8/1978 | Prince et al. | 235/432 |
| 4,115,870 | 9/1978 | Lowell | 364/900 |
| 4,169,290 | 9/1979 | Reed et al. | 364/900 |

Primary Examiner—Edward J. Wise
Attorney, Agent, or Firm—Fleit, Jacobson, Cohn & Price

[57] ABSTRACT

A portable meter-billing machine, for issuing bills to the customers of public utilities such as town gas and electricity which are supplied to the consumers through meters at the consumer's premises, comprises a portable carrying case for the official meter reader to carry to successive premises, the case being provided with a keyboard for entering the new meter reading at the premises of each successive consumer and housing a data memory storing the previous meter-readings of the respective consumers, a program memory storing a billing program and tariff data, a microprocessor and a bill printer controlled by the microprocessor in accordance with the billing program. The machine is responsive to a new meter reading for a consumer being entered on the keyboard to prepare billing data from the previous meter reading stored for that consumer and the stored billing program and tariff data and to print a corresponding bill for that consumer. The data memory has an input/output terminal for writing data into the data memory and for reading data out of that memory.

4 Claims, 3 Drawing Figures

PORTABLE BILLING MACHINE

This application is a continuation of application Ser. No. 694,495, filed Jan. 25, 1985, now abandoned, which is a continuation of application Ser. No. 553,414, filed Nov. 18, 1983, now abandoned, which is a continuation of application Ser. No. 262,982, filed May 20, 1981, now abandoned, which is a continuation of application Ser. No. 072,915, filed Sep. 6, 1979, now abandoned, which is a continuation-in-part of application Ser. No. 854,012, filed Nov. 22, 1977, now abandoned.

This invention relates to a portable meterbilling machine, for issuing bills to the customers of public utilities such as gas and electricity.

This invention is particularly applicable to public utilities such as gas and electricity which are supplied to consumers through meters at the consumer's premises, the meters being periodically read and a bill then issued to each consumer. In a present typical system, the files of a central computer hold customer information from which a billing program produces meter reading sheets. These sheets are then put into books, usually in walk-order, for the meter readers. The meter reader reads the meter at each of the premises and completes the corresponding sheet, if the customer is in, or leaves a card by way of notification if no access is obtained. The completed sheets are returned, usually via several clerical processes, to the computer section where their data is read into the computer. The billing program then produces a bill which is dispatched by post to the customer. The payments return by post, via showrooms or by the Giro system. In most cases the payments are checked, batched and totalled at least twice before being entered into the computer.

It will be noted that this system involves substantial manual intervention from the initial step of raising a meter reading sheet to the final step of recording payments.

The present invention provides a portable meter-billing machine, comprising a portable carrying-case provided with a keyboard for entering the new meter reading at the premises of each of a succession of consumers, said carrying case housing a data memory storing the previous meter-readings of the respective consumers, a program memory storing a billing program and tariff data, a microprocessor and a bill printer controlled by the microprocessor in accordance with the billing program, the machine being responsive to a new meter reading for a consumer being entered to prepare billing data from the previous meter reading stored for that consumer and the stored billing program and tariff data and to print a corresponding bill for that consumer, the data memory having an input/output terminal for writing data into the data memory and for reading data out of the data memory.

This machine enables the meter reader to provide the customer with a bill the instant after the meter is read. If no access can be gained to the customer's premises, then an estimated bill may be produced from an estimated reading if this is stored, for each consumer, in the data memory. If the customer wishes, he may pay the reader on the spot and the payment may be recorded in the data memory.

The central or mainframe computer is still used and data from this is transferred, indirectly, to the portable billing machine in respect, say, of a day's calls. Data captured by the portable billing machine during the day is transferred, eventually, back to the mainframe computer.

The main ability of the portable billing machine is to provide the customer with an instant bill. The meter reader is not required to master any new skills or to make any complex calculations himself. The portable machine has sufficient data storage capacity and calculating ability to be able to take account of differing tariff structures and details applicable to the different customers. It is also able to control its own printer and retain information for subsequent transfer to the mainframe computer. This fundamental change in the billing cycle considerably reduces the clerical functions normally associated with meter reading, bill production and distribution.

Accordingly, the delay in issuing a bill is reduced, reducing the number of debtors and reducing interest charges. A direct cost saving derives from a reduction in the clerical functions and postage. Also, any investment in the mainframe computer is protected, whilst requirements for data input to and output from the mainframe computer are much reduced.

An embodiment of portable meter-billing machine will now be described, by way of example only, with reference to the accompanying drawings, in which.

Figure 1:
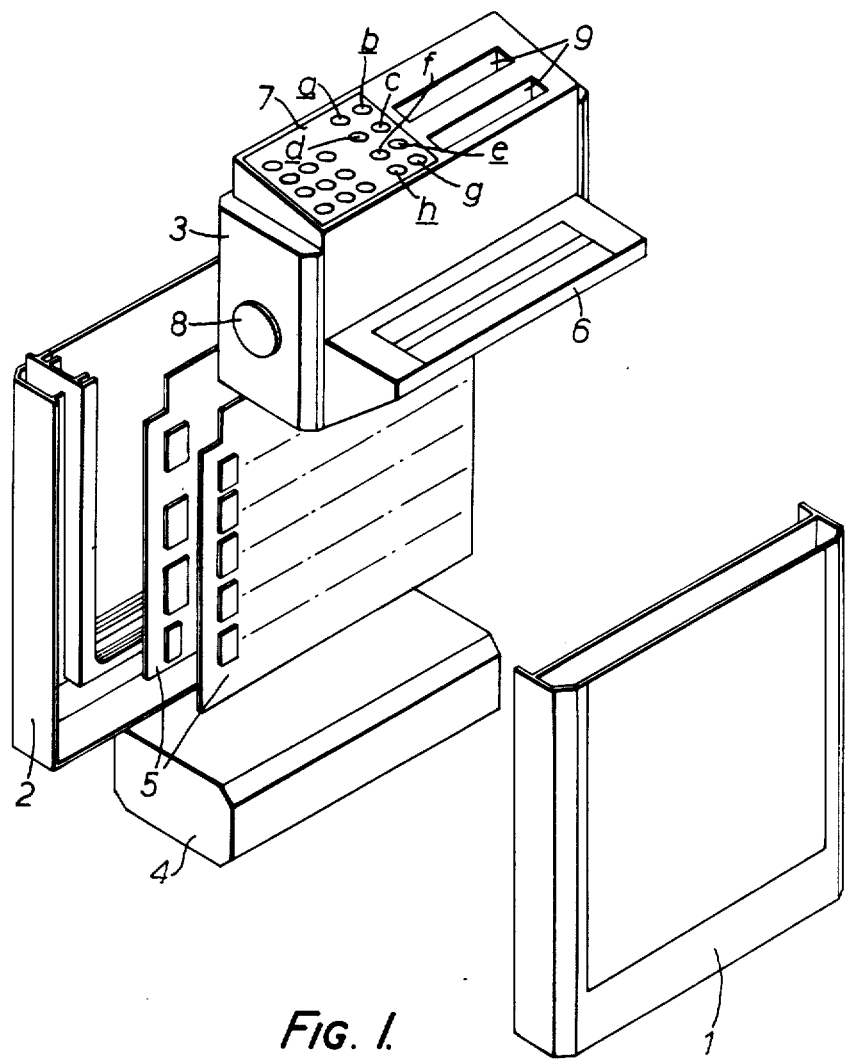
FIG. 1 is an exploded perspective view of a portable machine.

The machine comprises a single, rectangular casing in three parts 1,2,3. Lower front and rear parts 1 and 2 house a bank 4 of interchangeable rechargeable batteries at the bottom and a series 5 of parallel, vertical electronic circuit boards above the batteries.

The upper end of the casing is completed by the part 3 which incorporates a thermal printer 6, extending substantially the width of the casing along the front. The part 3 also includes, at the top of the machine, a keyboard 7 having both numerical and function keys. Numeric and function displays 9 are also provided.

The machine is relatively thin and rectangular in shape and constructed as a carrying case and a typical weight might be 2–4 kg. Fixing points 8 are provided on opposite sides for a carrying strap and an optional handle (not shown) is provided.

Figure 2:
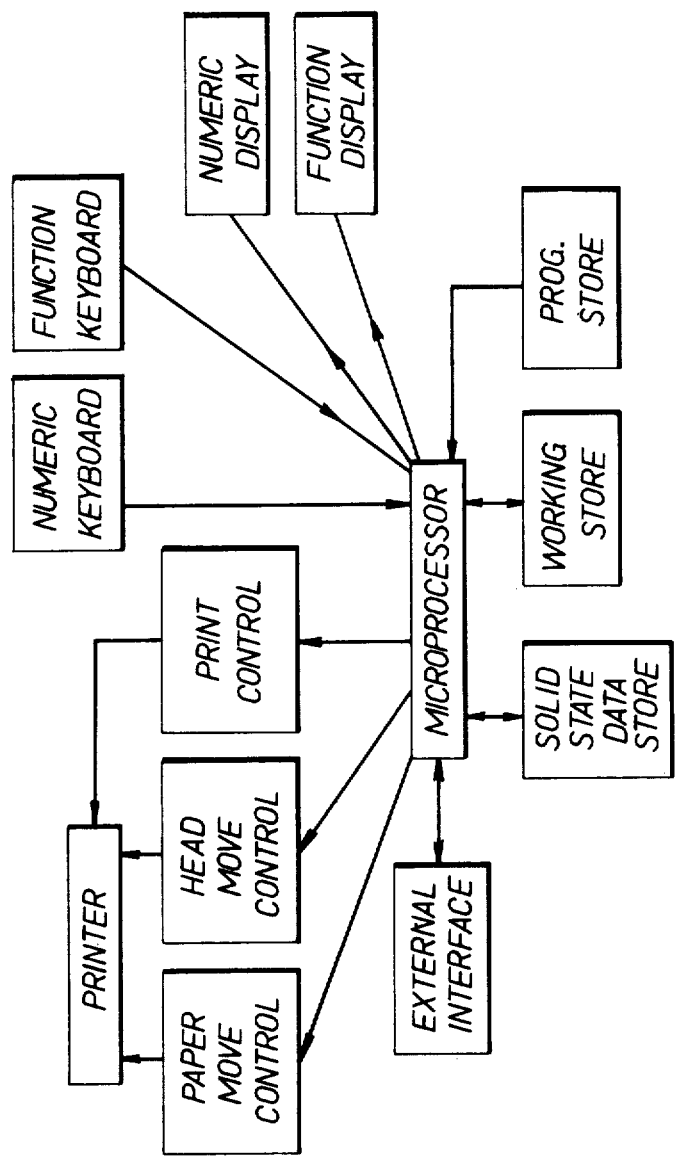
FIG. 2 is a systems diagram of the machine.

FIG. 2 is a block diagram of the functional elements of the machine. A microprocessor 214 is provided, together with a solid state data store 212, or other form of store (e.g. cassette, disc), for example of 44K ch. or 64K capacity, an RAM working store 210 and an RAM/ROM program store 208. The numeric and function keyboards 200, 202 and numeric and function displays 204, 206 are shown, likewise circuits for controlling the printer paper movement 220, head movement 222, and printing function 224. An external interface 216 for loading data into the machine or unloading data from the machine is also provided.

The daily use of the machine is as follows. Firstly, the day's data is loaded into the machine, typically for each consumer: sequence number, customer number, meter number, previous reading, previous reading date, maximum expected reading, minimum expected reading, estimated reading, tariff, customer's name and address, maximum bill value, any special instructions and other charges. The billing program and standard data, such as tariff structure tariff rate and VAT, are stored within the machine.

The meter reader is supplied with a walk list giving the street and number of each of the premises to be visited, together with respective sequence numbers. The meter reader may work in the order set by the walk list or may work in any other order, consulting the list for the sequence number to be keyed at each address that he visits.

The reader is required at each of the premises to press a "next reading" key a, whereupon the machine prints or displays standard information such as name and address of the customer, together with any special instructions. If he gains entry, he then keys in the meter reading, checks this on the machine's visual display and presses an "Accept" key b. The machine checks whether the reading is between the expected maximum and minimum limits. If it is not, the machine displays "re-enter" and the meter reader again enters the reading and presses the "Accept" key. If the reading is still outside the limits the machine displays "check meter number". If the operator finds this in order he presses the "Accept" key again, or otherwise an "Abandon" key c in response to which the information is stored for subsequent transfer to the mainframe computer to initiate a follow-up.

Where the meter is a credit meter, then the value of the gas, say, is calculated by the machine and a bill is issued. If the meter is one of a set, or where the bill is to be sent to a different address, then a bill is prepared and issued overprinted "for information only", the relevant data being stored. Budget plan customers can be dealt with similarly, or the current balance can be pre-loaded into the machine and an account issued indicating the present balance. The bill in all cases includes any other charges such as hire purchase.

If the meter reader is unable to gain entry at any of the premises, he presses a "no entry" key d, whereupon the machine prints an estimated bill to be left through the door.

The machine can also deal with pre-payment type meters. After the reader keys in the meter reading, the machine displays "Enter Cash". After counting the collected cash, the reader keys in the value, checks it on the display and presses the "Accept" key. Again, a "Re-enter" facility is provided if an apparent discrepancy occurs. Finally, the bill will be printed, taking into account the cash collected.

The machine deals with situations where credit customers wish to settle their bill on the spot with the meter reader. Thus, the machine displays "Cash or Credit?" once the bill is calculated. One of the "Cash", "Cheque" or "Credit" keys e, f, g is then pressed and the machine displays "Enter cash paid". The meter reader keys in the amount paid, checks the visual display and presses the "Accept" key. In the case of a cheque payment, the cheque number may be keyed in. Finally, the machine prints the bill with "paid with thanks" across the payment counterfoil.

The machine includes also a search facility for access to any selected one of the data items stored in the machine. Thus, a "Search" key h is pressed and the sequence number keyed in, followed by pressing the "Accept" key.

For loading and unloading data, a transcriber is used. Data from the mainframe computer is transferred to the transcriber by a telecommunications link or by magnetic tape. The transcriber converts this basic data into codes acceptable to the billing machine and at the same time stores it on a magnetic disc attached to the transcriber.

The transcriber is used in association with a visual display unit (VDU). A supervisor in charge of allocating work to different meter readers can examine each file (or workload) of data on this VDU. The supervisor can re-arrange the walk order, by manipulating the sequence numbers, before loading the individual billing machines. The VDU is used as the central operational point for loading and unloading data.

Where the meter reader works from home, the above supervisory transcriber is arranged to prepare a loaded cassette and includes the necessary tape deck. The individual meter reader then has a mains operated "home transcriber", having a tape deck and also a power supply for charging the batteries of the billing machine. The meter reader is delivered or picks up one or more cassettes for each day's work, together with the walk lists. The home transcriber is connected to the billing machine and operated to transfer the data on the cassette into the billing machine. The reverse procedure is employed for unloading data and returning it to the mainframe computer.

Preferably the printer of the billing machine is arranged to print on the bill a coded mark (such as a system of bars) identifying the customer and the amount due. This coded mark is such that it may be read by a light pen to facilitate dealing with incoming payments, and read into a store.

It will be appreciated that the central, mainframe computer may be replaced by several smaller machines.

In a modification, the data memory does not store the estimated reading for each meter, but instead the stored program includes a facility for the machine itself to calculate the estimated reading from the other data which is stored for the respective meter.

Figure 3:
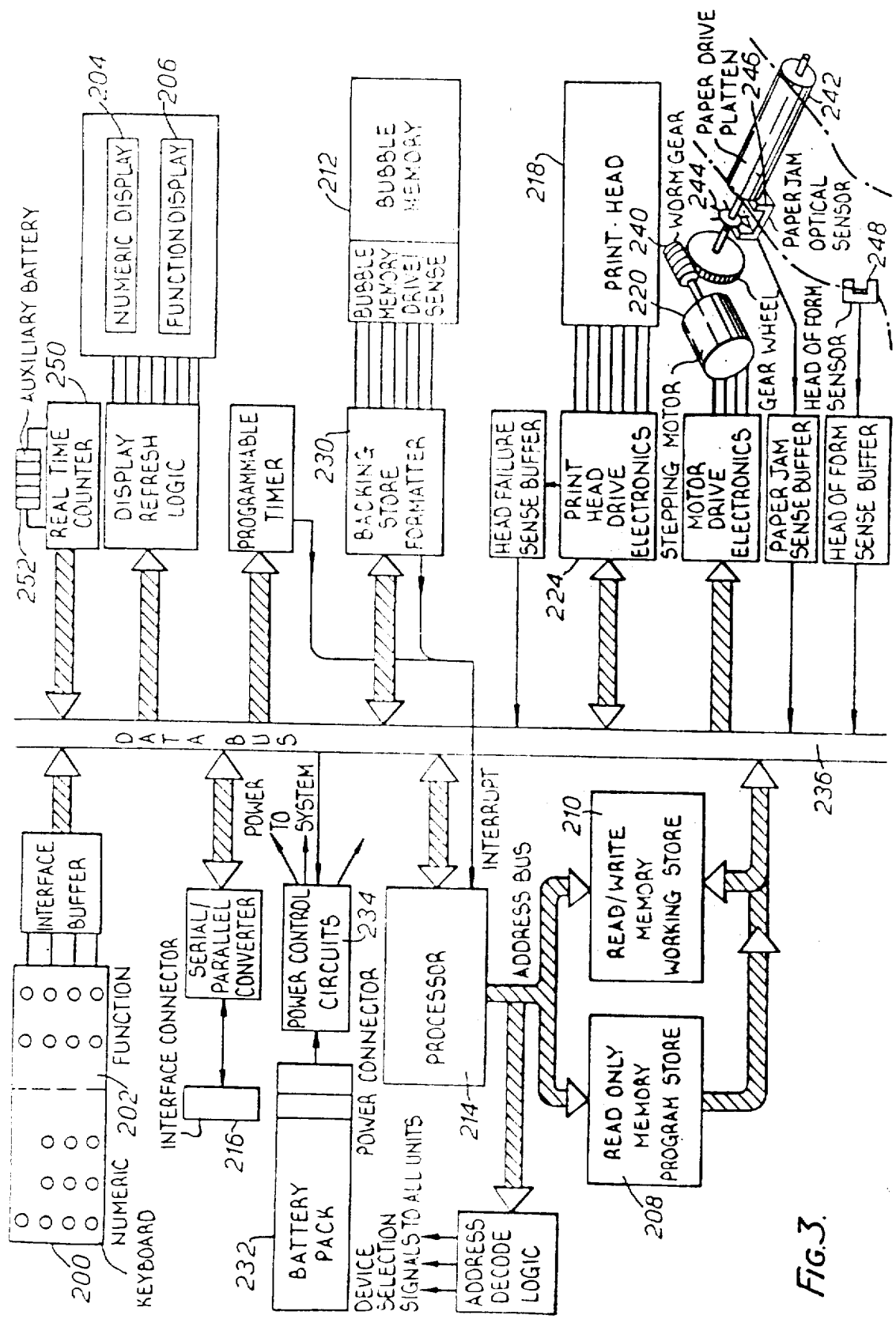
FIG. 3 shows in greater detail a block circuit diagram for the machine showing the interconnections of the systems design of FIG. 2.

The operation of the machine will be better understood by reference to FIG. 3 of the drawings in which a block diagram of a practical embodiment is shown. The block diagram of FIG. 3 will now be described as for FIG. 2 by reference to the daily operation of the machine which will serve to explain the transfer of information between the various integers within the machine. The daily use of the machine is as follows:

Firstly, the day's data is loaded in a digital format into the machine via interface connector 216. Data transfer is controlled by processor 214 and the serial digital data stream is converted into 8 bit parallel bytes, transferred via the data bus 236 to the read/write memory 210 and from there is passed to the bubble memory 212. The information is stored in the bubble memory in a serial format controlled by the backing store formatter 230.

The data comprises the following elements:
Customer File,
Print Format Control File,
Tariff File
Special Message File and
Software Overlay Files.

The Customer File includes for each customer a sequence number, the account number, the meter serial nos, previous reading, date of previous reading, maximum and minimum permissible readings and estimated reading, the billing tariff, the customer's name and address, the maximum permissible bill value, sundry charges and pointers to the special message/instructions and tarriff files.

The meter reader is also supplied with a printed walk list which relates each customer's premises to the sequence number stored in the bubble memory. When the machine has been loaded the battery pack 232 is inserted, causing the power control circuits 234 to energise the system. The processor accesses the programme overlay files in the bubble memory 212, loading them into the read/write memory 210 via main bus 236. The programme which performs this operation is permanently stored in the Read Only Memory 208.

The overlaid software accesses the function display to prompt the meter reader. If the meter reader presses next reading key a, the processor detects the operation via the data bus 236 and accesses the customer file, retrieving the next customer record in sequence from the bubble memory 212. The customer information is stored in the read/write memory 210 and the processor prompts the meter reader with the customer's name and address and special instructions on the display 206. Each element of this customer information is presented in turn as the meter reader presses the Accept key b. The processor 214 then prompts the meter reader to enter the meter reading for each meter in the customer record, and waits for the meter reader's responses. As meter readings are keyed in the processor 214 compares them with the minimum and maximum limits and queries any invalid entries. If the meter reader persists with an invalid entry, the processor prompts him via the function display 206 to check the meter serial number. If the meter serial number is as expected, the meter reader responds by keying Accept, and the meter reading is used to calculate the bill by the processor 214. If the meter serial number is wrong, then a note is recorded in the bubble memory for transfer later to the mainframe computer. When all meters have been read and the bill value calculated, the processor causes the stepping motor, 220, and the print head, 218, to operate to print the bill.

Characters are formed by the thermal print head, 218, which prints one line of dots at a time. The stepping motor, 220 causes the paper, which has a thermally sensitive coating to step past the print head 218 so that successive lines of dots build up the required character patterns. The print head 218 is controlled by the processor 214 which determines which dots are to be energised and for how long. Having energised the print head, the processor loads a delay value into a programmable timer 238 and then waits for the timer to interrupt. While waiting, the processor decodes the next dot pattern to be printed. When a row of dots has been printed the interrupt from the timer 238 prompts the processor to switch off the print head and the processor then energises the stepping motor, 220, again using the programmable timer 238 to control the pulse widths to the motor. The stepping motor drives the paper via a worm and wheel gearbox, 240 coupled to a rubber platen 242. A vaned wheel 244 attached to the platen drive shaft revolves between the emitter and sensor of an optical sense device 246. The processor samples the output of the sensor 246 to confirm that the platen is rotating when required to do so. Failure to detect rotation implies a paper jam or other fault condition.

On completion of bill printing the stepping motor is caused to feed paper until the processor detects that "head of form" has been reached. This is achieved by optical sensor 248 monitoring one edge of the paper. Notches cut in the paper edge at the top of each preprinted bill form are detected by the sensor so that the processor can align the paper at the start of each new transaction.

Finally, the results of the billing transaction are recorded by the processor in the bubble memory, 212. These results comprise the sequence number, the customer account number, the new meter readings and the bill total. This information forms the results file which will be transferred to the mainframe computer on completion of the day's work. The system includes facilities for those situations in which credit customers may settle their bill on receipt. If this option is in operation, prior to printing the bill, the processor prompts the meter reader to enter the payment method and display the bill total. The meter reader then keys the amount to be paid and the processor causes the bill to be printed with a receipt across the payment counter foil. If the meter reader does not wish to visit premises in the sequence in which they appear in the customer file, he may press the search key h followed by the sequence number required. The processor then retrieves the required customer record from the bubble memory and subsequent transactions proceed from that point in the customer file until the search facility is used again. When the processor detects the end of the customer file, it performs a search of the whole file again in order to identify customers which may have been omitted by the meter reader using the search key.

If the meter reader is unable to gain entry, he presses key d. The machine then prints a bill based on the stored estimated meter readings which may be left at the premises.

If pre-payment meters are present, the processor prompts the meter reader to enter the amount of collected cash. A bill is then printed, taking into account the amount of cash collected. It is possible that the machine may be used on several days after a single loading process, in this situation each bill presented must carry the actual date on which it is printed. The machine is supplied with a date of loading during the load process, but must subsequently maintain the correct date.

For this purpose the processor is provided with a real time counter 250 powered independently of the main battery by an auxiliary battery 252. The counter provides a crystal controlled elapsed time indication for periods of many days.

What we claim is:

1. A portable utility billing apparatus for enabling a utility meter reader to: (1) obtain information concerning utility meters of a plurality of utility customers on a selected route including current meter value information from those meters that can be read; (2) record the current meter value information; (3) calculate actual customer utility charges for those meters that can be read and estimated customer utility charges for those meters that could not be read; (4) print customer bills with the actual or estimated calculated customer charges thereon; and (5) deliver the bills to selected route customers; said apparatus comprising:
   a portable support to be carried by the meter reader;
   a mass data storage receiving means mounted on the support for receiving a mass data storage device containing previous meter value information and general customer/meter information and estimated current meter value information;
   a numeric display means for visually displaying information to the utility meter reader;

a memory means containing tariff information and a control program;

a data entry means for enabling the utility meter reader to enter the current meter value information;

an arithmetic calculating means for receiving the previous meter value information, the tariff information, the current meter value information and the estimated current meter value information;

a bill printing means for printing a customer bill with the customer charges thereon;

an electrical battery means mounted on the support as a source of electrical energy;

a control means responsive to the control program operatively connected to various means to utilize electrical energy from the electrical battery means for:
  (1) reading the general customer meter information from the mass storage device and displaying such general customer/meter information on the numeric display means to assist the meter reader in reading the meters;
  (2) entering the current meter value information from the data entry means for those meters that are read and displaying the current meter value information on the numeric display;
  (3) writing the current meter value information into the mass data storage device to record the same;
  (4) operating the arithmetic calculating means to (a) calculate the actual customer charges for those meters that are read and (b) calculate the estimated customer charges for those meters that are not read;
  (5) writing the actual and estimated calculated customer charges into the mass data storage means; and
  (6) operating the bill printing means to prepare customer bills with the actual and estimated customer charge printed thereon to enable the meter reader to deliver the printed customer bills to the customers.

2. A portable utility billing apparatus for enabling a utility meter reader to: (1) read utility meters of a plurality of utility customers on a selected route and obtain current meter value information concerning such customers; (2) record the current meter value information; (3) calculate customer utility charges; (4) print customer bills with the calculated customer charges thereon; and (5) deliver the bills to a selected route customers; said apparatus comprising:

a portable support to be carried by the meter reader;

a mass data storage receiving means mounted on the support for receiving a mass data storage device containing previous meter value information and general customer information;

a numeric display means visually displaying information to the utility meter reader;

a non-volatile, read only memory (ROM) means containing a control program;

a non-volatile electrically alterable memory means capable of being reprogrammed by the control program, in which the electrically alterable memory contains tariff information;

a data entry means for enabling the utility meter reader to enter the current meter value information;

an arithmetic calculating means for receiving the previous meter value information, the tariff information, and the current meter value information and calculating the customer charges therefrom;

a bill printing means for printing a customer bill with the customer charges thereon;

a control means operatively connected to the non-volatile electrically alterable memory means for:
  (1) reading the general customer information from the mass storage device and displaying such general customer information on the numeric display means to assist the meter reader in reading the meters;
  (2) entering the current meter value information from the data entry means and displaying the current meter value information on the numeric display;
  (3) writing the current meter value information onto the mass data storage device to record the same;
  (4) operating the arithmetic calculating means to calculate the customer charges based upon the tariff information, current meter value information, and previous meter value information;
  (5) writing the calculated customer charges into the mass data storage means; and
  (6) operating the bill printing means to prepare the customer bills with the customer charge printed thereon to enable the meter reader to deliver the printed customer bills to The customers.

3. The portable utility billing apparatus defined in claim 2, wherein the memory means is an electrically alterable read only memory means.

4. A portable utility billing apparatus for enabling a utility meter reader to: (1) read utility meters of a plurality of utility customers on a selected route and obtain current meter value information concerning such customers; (2) record the current meter value information; (3) calculate customer utility charges; (4) print customer bills with the calculated customer charges thereon; and (5) deliver the bills to the selected route customers; said apparatus comprising:

a portable support to be carried by the meter reader;

a mass data storage receiving means mounted on the support for receiving a mass data storage device containing previous meter value information and general customer information;

a numeric display means for visually displaying information to the utility meter reader;

a non-volatile, read only memory (ROM) means containing control program;

a non-volatile electrically alterable memory means capable of being reprogrammed by the control program, in which the electrically alterable read only memory contains tariff information;

a data entry means for enabling the utility meter reader to enter the current meter value information;

an arithmetic calculating means for receiving the previous meter value information, the tariff information, and the current meter value information and calculating the customer charges therefrom;

a bill printing means for printing a customer bill with the customer charges thereon;

a control means operatively connected to the electronically alterable memory means for:
  (1) reading the general customer information from the mass storage device and displaying such general customer information on the numeric display means to assist the meter reader in reading the meters;

(2) entering the current meter value information from the data entry means and displaying the current meter value information on the numeric display;

(3) writing the current meter value information into the mass data storage device to record the same;

(4) operating the arithmetic calculating means to calculate the customer charges based upon the tariff information, current meter value information, and previous meter value information; and (5) operating the bill printing means to prepare the customer bills and the customer charge printed thereon to enable the meter reader to deliver the printed customer bills to the customers.

* * * * *